US010019867B2

(12) United States Patent
Shiraishi

(10) Patent No.: US 10,019,867 B2
(45) Date of Patent: Jul. 10, 2018

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventor: Kazutaka Shiraishi, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 50 days.

(21) Appl. No.: 15/210,618

(22) Filed: Jul. 14, 2016

(65) Prior Publication Data

US 2017/0092043 A1 Mar. 30, 2017

Related U.S. Application Data

(60) Provisional application No. 62/233,581, filed on Sep. 28, 2015.

(51) Int. Cl.
*G06F 17/00* (2006.01)
*G07F 17/32* (2006.01)

(52) U.S. Cl.
CPC .......... *G07F 17/3213* (2013.01); *G07F 17/32* (2013.01)

(58) Field of Classification Search
None
See application file for complete search history.

(56) References Cited

U.S. PATENT DOCUMENTS 7,625,280 B2 * 12/2009 Singer .................... G07F 17/34 273/143 R
8,602,868 B2 12/2013 Johnson et al.
2006/0079313 A1 4/2006 Trainor et al.
2008/0113743 A1 5/2008 Dunaevsky et al.
2010/0113133 A1 * 5/2010 Leupp .................... G07F 17/34 463/20
2014/0248936 A1 * 9/2014 Basallo .................. G07F 17/34 463/20

FOREIGN PATENT DOCUMENTS

AU 2014250731 A1 11/2014

OTHER PUBLICATIONS

Patent Examination Report No. 1 (AU 2015230944); dated Oct. 27, 2015.
Patent Examination Report No. 2 (AU 2015230944); dated Dec. 8, 2015.
Patent Examination Report No. 3 (AU 2015230944); dated Jul. 14, 2016.

* cited by examiner

*Primary Examiner* — Paul A D'Agostino
(74) *Attorney, Agent, or Firm* — Howard & Howard Attorneys PLLC

(57) ABSTRACT

A gaming machine that provides an operation unit, a display unit, and a control unit. The operation unit is configured to receive an operation of the player. The display unit is operably coupled to the operation unit and is configured to display a plurality of cells. The plurality of cells is arranged in a plurality of rows and columns. The control unit is operably coupled to the operation unit and the display unit and, for each instance of the game, randomly establishes a symbol to be displayed within each of the plurality of cells. The control unit is further configured to provide a first instance of the game and to display the symbols established for the first instance of the game in the respective cells, and to automatically add a new row of cells to the display unit prior to each subsequent instance of the game.

31 Claims, 18 Drawing Sheets

FIG. 4

70

| 71 | 72 | 73 | 74 | 75 |
|---|---|---|---|---|
| PicC | K | 9 | PicB | PicA |
| Q | PicA | J | Trig | 10 |
| Wild | Q | PicB | A | K |
| 9 | PicC | PicD | PicD | 9 |
| PicD | PicD | PicA | PicC | A |
| PicC | A | PicA | PicD | A |
| PicB | J | PicA | A | A |
| 10 | PicC | K | 10 | Q |
| K | PicD | 10 | PicB | Trig |
| PicA | A | Q | K | 9 |
| Wild | PicD | PicC | PicC | Wild |
| J | 9 | PicD | Q | PicA |
| PicA | PicA | A | A | PicA |
| 9 | PicA | PicA | 9 | PicD |
| PicA | PicA | A | PicA | J |
| PicA | K | K | PicD | PicD |
| 10 | PicB | PicC | J | K |
| Trig | 10 | PicD | PicC | Wild |
| Wild | Trig | 10 | K | PicC |

60

GAMING MACHINE, CONTROL METHOD FOR MACHINE, AND PROGRAM FOR GAMING MACHINE

CROSS REFERENCE TO RELATED APPLICATIONS

This application claims the benefit of U.S. Provisional Patent Application Ser. No. 62/233,581, filed Sep. 28, 2015, and also claims priority to Australian Patent Application Serial No. 2015230944, filed Sep. 28, 2015, the disclosures of which are hereby incorporated by reference in their entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes an operation unit, a display unit, and a control unit. The operation unit is configured to receive an operation of the player. The display unit is operably coupled to the operation unit and is configured to display a plurality of cells. The plurality of cells are arranged in a plurality of rows and columns. The control unit is operably coupled to the operation unit and the display unit and, for each instance of the game, randomly establishes a symbol to be displayed within each of the plurality of cells. The control unit is further configured to provide a first instance of the game and to display the symbols established for the first instance of the game in the respective cells, and to automatically add one or more new rows of cells to the display unit prior to each subsequent instance of the game.

In another aspect of the invention, a control method for a gaming machine provides a game to a player. The gaming machine includes an operation unit, a display unit, and a control unit. The operation unit is configured to receive an operation of the player. The display unit is operably coupled to the operation unit and is configured to display a plurality of cells. The plurality of cells are arranged in a plurality of rows and columns. The control unit is operably coupled to the operation unit and the display unit and, for each instance of the game, randomly establishes a symbol to be displayed within each of the plurality of cells. The method includes the steps of providing a first instance of the game and displaying the symbols established for the first instance of the game in the respective cells, and automatically adding one or more new rows of cells to the display unit prior to each subsequent instance of the game.

In still another aspect of the present invention, a program for a gaming machine provides a game to a player. The gaming machine includes an operation unit, a display unit, and a control unit. The operation unit is configured to receive an operation of the player. The display unit is operably coupled to the operation unit and is configured to display a plurality of cells. The plurality of cells are arranged in a plurality of rows and columns. The control unit is operably coupled to the operation unit and the display unit and, for each instance of the game, randomly establishes a symbol to be displayed within each of the plurality of cells. The program of the gaming machine performing the steps of: providing a first instance of the game and displaying the symbols established for the first instance of the game in the respective cells, and automatically adding one or more new rows of cells to the display unit prior to each subsequent instance of the game.

BRIEF DESCRIPTION OF DRAWINGS

FIG. 4 is a figure showing one example of a symbol arrangement showing the order of symbols displayed on the determination area in FIG. 3.

DETAILED DESCRIPTION OF EMBODIMENTS

A gaming machine according to an embodiment of the present invention referencing the attached figures is described in detail below. Further, duplicated descriptions will be omitted for identical attached symbols in identical or corresponding parts in each figure.

Figure 1:
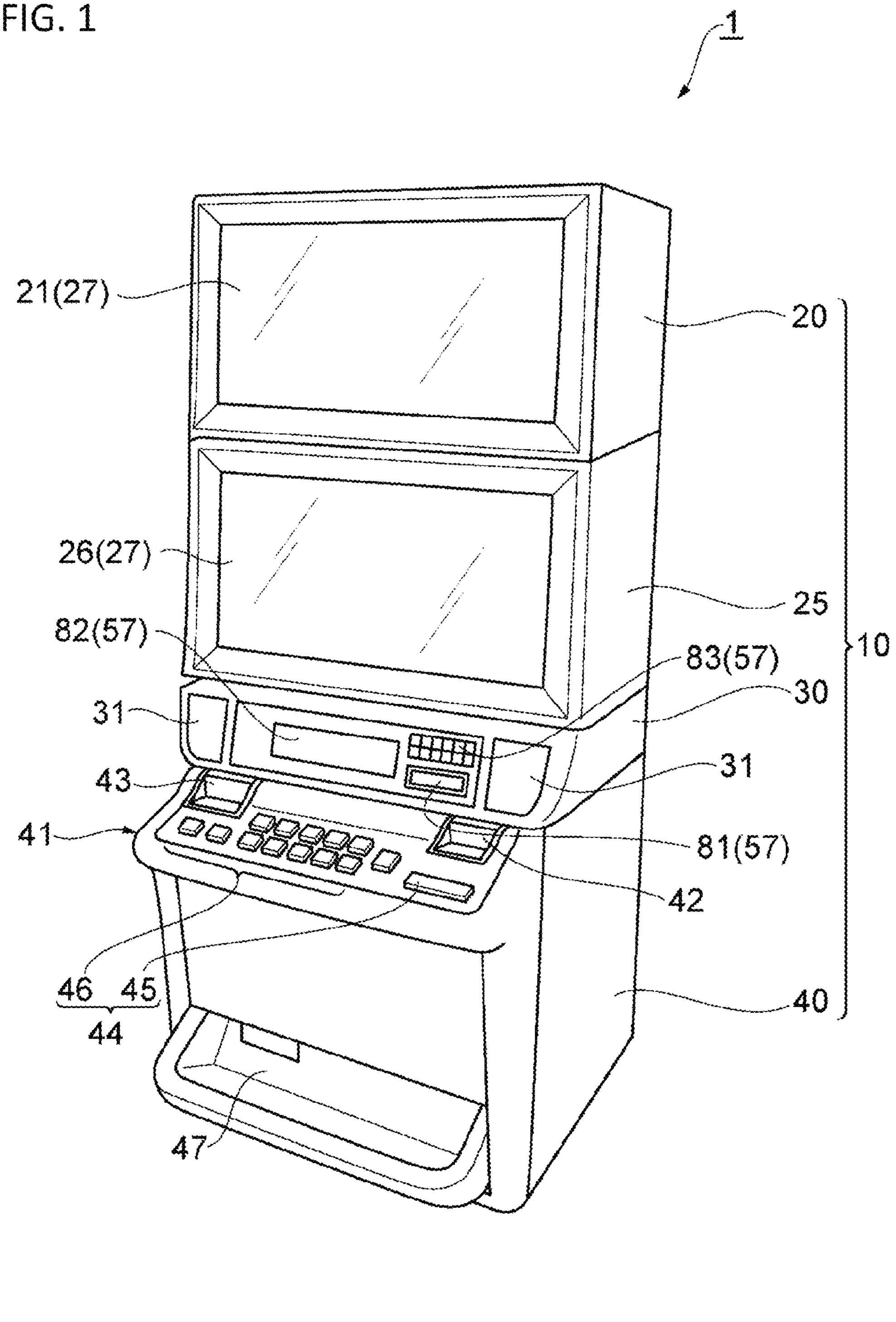
FIG. 1 is a perspective view of the gaming machine according to the first embodiment.

The gaming machine according to the present embodiment receives a predetermined game value from the player, generates a game result, and provides a payout to the player according to the game result. FIG. 1 is a perspective view of a gaming machine 1 according to the present embodiment. As shown in FIG. 1, this gaming machine 1 provides a first cabinet 20 providing an upper display 21, a second cabinet 25 providing a lower display 26, a third cabinet 30 that houses a player tracking unit 57 and a control panel 41, and has a housing 10 configured from a fourth cabinet 40 that houses a control unit 50 that controls each part. The control unit 50 also implements a random number generator (RNG) that is used during operation of the game. Each configuration is described below.

The first cabinet 20 is provided on the upper part of the housing 10, and the second cabinet 25 is provided below the first cabinet 20. The upper display 21 provided on the first cabinet 20 and the lower display 26 provided on the second cabinet 25, are flat panel display devices such as both liquid crystal display devices and organic EL display devices and the like, and by controlling via each control unit 50 the game screen mentioned below functions as a display unit 27 provided to the player.

The third cabinet 30 is provided below the second cabinet 25. Speakers 31 are provided on the left and right of the front surface of the third cabinet 30, and by controlling via the control unit 50, sound is provided to the player. Further, the player tracking unit 57 is housed on the center of the front surface of the third cabinet 30. The player tracking unit 57 has a card reader 81 that recognizes a player identification card, a display 82 that presents data to the player, and a keypad 83 that receives input by the player. This type of player tracking unit 57, reads information recorded on the player identification card inserted by the player into the card reader 81, and displays the information and/or information acquired by communicating with the external system on the display 82, by cooperatively operating with the control unit 50 mentioned below or an external system. Further, input from the player is received by the keypad 83, the display of the display 82 is changed according to the input, and communication with the external system is carried out as necessary.

The fourth cabinet 40 is provided below the third cabinet 30. On the fourth cabinet 40, one part is made to project from a front side, and the control panel 41 is provided. On the control panel 41, a bill/ticket identification unit 42, the printer unit 43, and an operation unit 44 are provided.

The bill/ticket identification unit 42 is disposed on the control panel 41 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part on the inside of the fourth cabinet 40. The bill/ticket identification unit 42, receives and identifies bills and tickets (including vouchers and coupons) that are the game value as a game executing value, and notifies the control unit 50 mentioned below.

The printer unit 43, is disposed on the control panel 41 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 43, under the control of the control unit 50 mentioned below, prints information on paper and outputs a ticket according to credit payout processing from the gaming machine 1. The output ticket can use the payout credit as game play by being inserted into the bill/ticket identification unit of another gaming machine, or, can be exchanged for cash by a kiosk terminal inside of the casino or a casino cage.

The operation unit 44 receives the operation of the player. The operation unit 44 is a group of buttons that receives various instructions from the player on the gaming machine 1. The operation unit 44, for example, has a spin button 45 and group of setting buttons 46. The spin button 45 receives an instruction to start (start rotating the reel) the game listed below. The group of setting buttons 46 includes a group of bet buttons, a group of line-designation buttons, a max bet button, and a payout button and the like. The group of bet buttons receive an instruction operation regarding the bet amount of credits (bet number) from the player. The group of line-designation buttons receive an instruction operation that designate a pay line (referred to as an effective line below) subjected to a line judgment below from the player. The max bet button, receives an instruction operation regarding the bet of the maximum amount of credits that can be at one time from the player. The payout button receives an instruction operation instructing a credit payout accumulated in the gaming machine 1.

Further, on the inside of the fourth cabinet 40, a control board equipped with a central processing unit 51 (abbreviated as CPU below) that configures the control unit 50, an interface unit (or part) 52, a memory 53 and a storage 54 and the like is incorporated. The control board configured so that communication is possible through the interface unit 52 and each of the components equipped on the first cabinet 20, the second cabinet 25, the third cabinet 30, and the fourth cabinet 40, controls the operation of each part by executing the program recorded in the memory 53 or the storage 54 of the CPU 51, and provides a game to the player.

Figure 2:
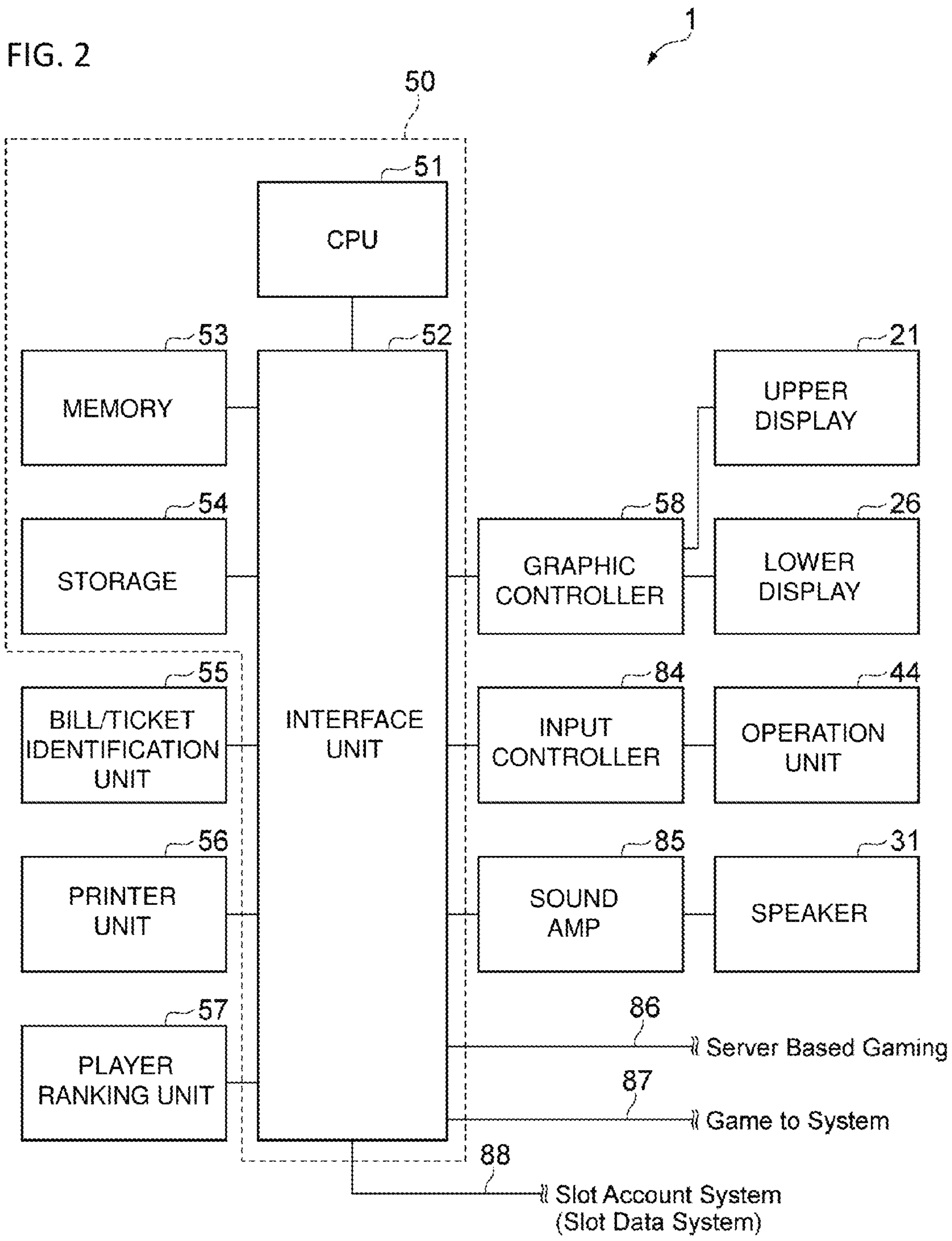
FIG. 2 is a functional block diagram of the gaming machine in FIG. 1.

FIG. 2 shows a functional block diagram of the gaming machine 1 according to the present embodiment. The gaming machine 1 provides the control unit 50. The control unit 50 is configured as the interface unit 52 including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound amp 85 are connected. That is, the control unit 50 is connected to the operation unit 44 through the input controller 84, and connected to the upper display 21 and/or the lower display 26 through the graphic controller 58. Further, when illumination that provides decorative lighting to the gaming machine 1 is provided, the illumination is controlled under the control of the control unit 50 on the interface unit 52, and an illumination controller that provides a decorative lighting effect may be connected.

The control unit 50, which includes memory 53 and storage 54, controls each part by executing a program stored in the memory 53 and the storage 54, and provides a game to the player. Here, for example the memory 53 and storage 54 may be configured to store a program and data of an operating system and subsystem that provides the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below.

The bill/ticket identification unit 55 corresponds to the bill/ticket identification unit 42, receives bills or tickets in the insertion opening, and notifies the control unit 50 identifying information corresponding to the payout processing of an assortment of bills or credits. The bill/ticket identification unit 55 notifies the information to the control unit 50, and the control unit 50 increases the usable credit amount inside of the game according to the notified content. The printer unit 56 corresponds to the printer unit 43, and under the control of the control unit 50 that receives an operation of the payout button of the group of setting buttons 46, information corresponding to the credit payout processing from the gaming machine 1 is printed and output on a printed ticket.

The player tracking unit 57 cooperatively operates with the control unit 50, and sends and receives information and the like of the player from the casino management system. The graphic controller 58 controls the upper display 21 and the lower display 26, under the control of the control unit 50, and displays a display image that includes various graphic data. The sound amp 85 drives the speakers 31 under the control of the control unit 50, and provides various sounds such as an announcement, sound effects, BGM and the like.

Further, the interface unit 52, has various communication interfaces for communicating with the exterior of the gaming machine 1, for example can communicate with an external network by Ethernet 86, 87, and a serial output 88. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3:
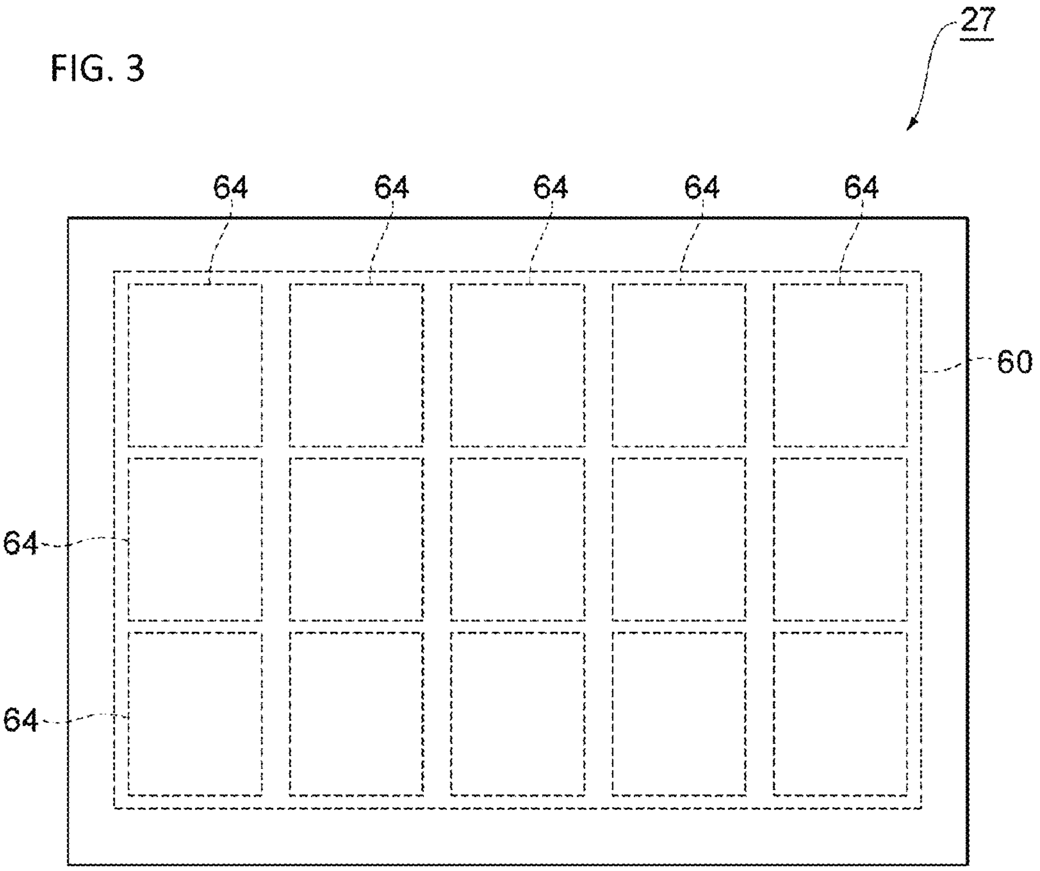
FIG. 3 is a diagrammatic illustration of a determination area of the gaming machine in FIG. 1 according to an embodiment of the present invention.

FIG. 3 is a figure schematically showing a game screen provided by the gaming machine 1 according to the present embodiment. Such a game screen displays on the display unit 27 (the upper display 21 and/or the lower display 26) by the control unit 50 executing a predetermined program. The present embodiment shows the state of displaying the game screen on the lower display 26. As shown in FIG. 3, this game screen has a determination area 60 for displaying symbols. By using such a game screen, the gaming machine 1 of the present embodiment, operates as a slot machine that pays a payout according to a winning combination of symbols displayed on the determination area. As discussed in more depth below, an additional row or rows of cells 64 may be automatically added to the determination area 60. For instance, in one embodiment of the present invention, a single additional row of cells 64 may be automatically added to the determination area 60. In another embodiment, a predetermined number, e.g., 4, of additional rows of cells 64 may be automatically added to the determination area 60. In still another embodiment, a variable number of rows may be added.

The display unit 27 displays a plurality of symbols in the determination area 60. The determination area, or grid, 60 that has a plurality of rows (r) and columns (c). The determination area 60 is configured by a plurality of cells 64 that are the stop position of symbols. Specifically, the determination area 60 may be configured by 15 cells disposed in a grid shape of 3 rows and 5 columns. Further, omitted in FIG. 3, the display unit 27 can display a decorative area, and an area that displays credit amount, bet number, and a credit amount obtained by winning (WIN number) and the like, outside of the determination area 60. On each of the plurality of cells 64 of the determination area 60, one symbol is stopped and displayed.

On each cell 64 of the determination area 60, as shown in FIG. 4, a predetermined symbol is displayed based on the symbol arrangement of virtual reel strips 71 to 75 configured of a virtual reel set 70. That is, the cells 64 of the determination area 60 correspond to the virtual reel strips 71 to 75 by column, and the symbols disposed on predetermined parts of each virtual reel strip 71 to 75 are displayed. Furthermore, as mentioned below, by moving (scrolling or spinning) each symbol by column based on the symbol arrangement of the virtual reel strips 71 to 75, the symbols displayed on the cells 64 of the determination area 60 change, and by stopping the movement (scrolling or spinning) by columns, the symbols are stopped. Here, the virtual reel strips 71 to 75 are data where the control unit 50 uses a program having the memory 53 or the storage 54, and data showing the symbol arrangement (i.e. the order of symbols on each reel) regulated by each cell column. Further, the virtual reel set 70 is a general term for such virtual reel strips 71 to 75.

Figure 5:
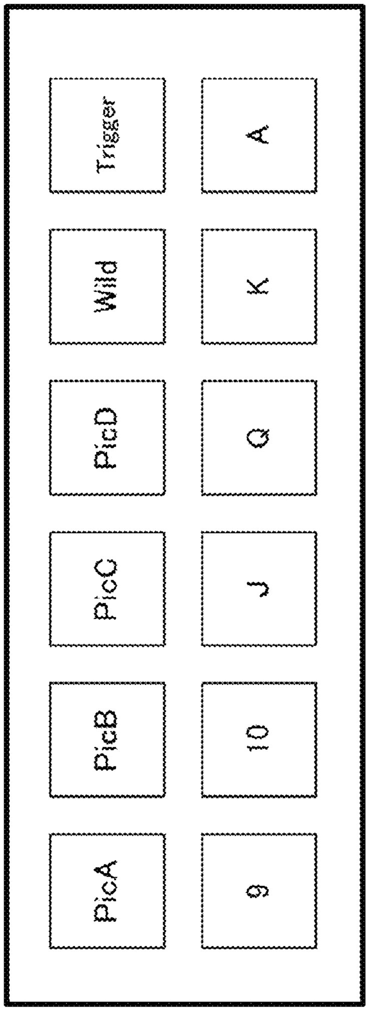
FIG. 5 is a figure showing the symbols displayed on the determination area in FIG. 3.

Each virtual reel strip 71 to 75, in an example of FIG. 4, is configured by 19 symbols and those symbols are aligned in an order defined by each reel. FIG. 5 is the details of symbols of the figure shown in FIG. 4. Each virtual reel strip 71 to 75 includes symbols selected from a symbol set of 13 varieties shown in FIG. 5. This symbol set includes card symbols ("9", "10", "J", "Q", "K", and "A") that imitate playing cards as regular symbols, and picture symbols ("PIC-a", "PIC-b", "PIC-c", and "PIC-d") that show a pattern. Further, this symbol set includes a wild symbol ("Wild") that is substituted as another symbol when a win is determined and a trigger or symbol ("Trig") that is used to determine if a feature or feature game is to be played (see below). Each of these symbols have a different rank from each other regarding their value when winning, their rank gradually raises in this order: "9", "10", "J", "Q", "K", "A", "PIC-d", "PIC-c", "PIC-b", "PIC-a". A combination of symbols that includes high-ranking symbols when winning, can obtain a larger winning payout compared to a combination of low-ranking symbols when winning.

The control unit 50 that starts a game, determines the stop position of each virtual reel strip 71 to 75 randomly, the virtual reel strips 71 to 75 move from a current position, and the operation to stop on a stop position uses the display unit 27 (for example the lower display 26) and is expressed. Due to this, in the determination area 60, the symbols included on the virtual reel strips 71 to 75 are continuously moved (scrolled or spun) in the vertical direction of the determination area 60, and one symbol of one cell 64 aligned in an order of the symbol based on the symbol arrangement is stopped so that it is displayed.

The control unit 50 changes and stops the plurality of symbols displayed on the display unit 27 according to the operation of the player received by the operation unit 44, and a payout is paid according to the stopped symbols inside the determination area 60.

In the determination area 60, a pay line is set that is used when winning is determined. The pay line is set to be extended over the column on the right end from the cells of the column of the left end, and is a line that combines the plurality of cells 64 determining a win. The number of effective lines within the set pay line is selected by the operation of a group of line designation buttons included in the group of setting buttons 46 of the operation unit 44 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 1 of the present embodiment, a predetermined number of pay lines (LINE 1-40) of cells with three rows and five columns in the determination area 60 is set (reference FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

In another aspect of the present invention, two or more of the reels 70 may be replaced by a single reel that includes enlarged cells. The replacement of the two or more reels 70 with a single reel may occur in the main or primary game or in the feature game. If the replacement occurs during the feature game, the replacement reel may be either be only for one of the free games/spins or may be used for the remaining free games/spins. In one embodiment, the replacement of the two or more reels 70 with a single reel is triggered by a mystery event, e.g., is independent of the outcome of a game (primary or feature). In one embodiment of the present invention, the size of the enlarged symbol(s) on the replacement reel is dependent upon the number of reels being replaced. For instance, if two reels are replaced with a replacement reel, then each enlarged cell/symbol is the size of 4 cells/symbols of the replaced reels (2×2). If three reels are replaced with a replacement reel, then each enlarged cell/symbol is the size of 9 cells/symbols from the replaced reels (3×). One game machine that utilizes the replacement reels is disclosed in U.S. patent application Ser. No. 14/836,843, filed Aug. 26, 2015) which claims priority to Australian Patent Application 2014224114, filed on Sep. 12, 2014, the disclosure of which is hereby incorporated by reference.

Figure 6:
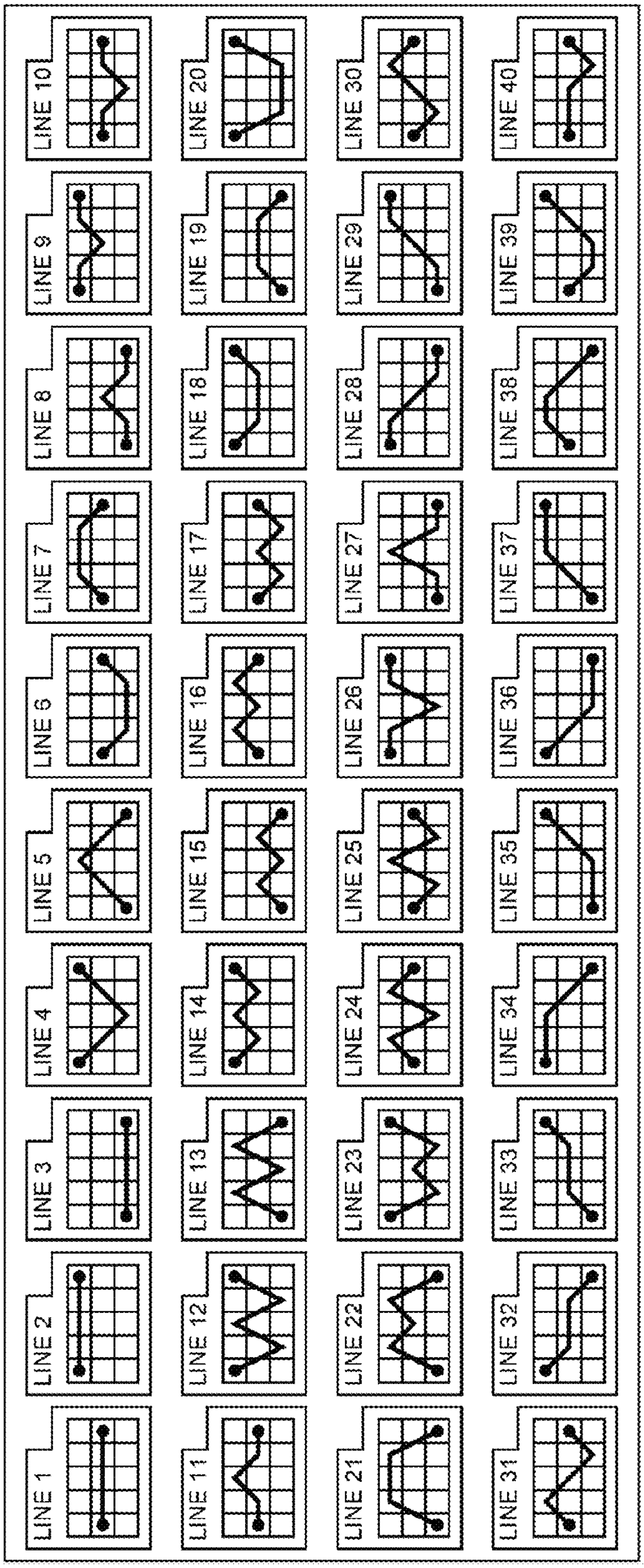
FIG. 6 is a figure showing one example of a pay line set on the determination area in FIG. 3.

It should be noted that pay lines shown other than (or in addition) to the pay lines shown in FIG. 6 may be used. In general, the pay lines shown in FIG. 6 start in the first column and end in the last column and include one cell per column. However, one or more pay lines could include one or more cells in the same column and may include a vertical pay line. In addition, a pay line dos not need to include one cell from each column. In one embodiment, in addition, or in place of the pay lines shown in FIG. 6, the pay lines used for the games could include a cell from each column, plus any call from the right adjacent column. In such an embodiment, where such pay lines comprise the only pay lines in the game, a designation area 60 having a 3-3-3-3-3 cell matrix provides 3×3×3×3×3=243 pay lines, a 4-4-4-4-4 cell matrix provides 4×4×4×4×4=1,024 pay lines, a 5-5-5-5-5 cell matrix provides 5×5×5×5×5=3,125 pay lines, a 3-4-4-4-3 cell matrix provides 3×4×4×4×3=576 pay lines, a 3-5-5-5-3 cell matrix provides 3×5×5×5×3=1,125 pay lines, a 3-6-6-6-3 cell matrix provides 3×6×6×6×3=1,944 pay lines, a 3-7-7-7-3 cell matrix provides 3×7×7×7×3=3,087 pay lines and a 3-8-8-8-3 cell matrix provides 3×8×8×8×3=4,608 pay lines.

The gaming machine 1 of the present embodiment, may provide two types of games, a regular game (referred to as a main game, or prime game) provided when predetermined conditions are not satisfied, and a special game (referred to as a bonus game, or feature game, and includes providing one or more free games or spins that do not consume game value) provided when predetermined conditions are satisfied. Concerning a regular game and a special game, the symbols displayed in the determination area 60 configure a combination of symbols that are the result of a game, and determine a win. In the gaming machine 1 according to the present embodiment a feature stage can be carried out. A feature stage can be used in both a regular game and a special game. A situation where a feature stage is used in a special game is described below. For example, in the situation of a regular game, the control unit 50 two-dimensionally displays an object that shows a symbol on the display unit 27, and by moving the object inside of a two-dimensional plane in a vertical direction a plurality of symbols can be changed in the determination area 60. Here, the object that shows a symbol may be two-dimensional CG (Computer Graphics), and may be three-dimensional CG calculated from a three-dimensional model. The form that two-dimensionally displays an object showing a symbol on the display unit 27, displays an object on a screen of the display unit 27 and a parallel surface, and is equivalent to a form displayed by a general slot machine. In the specification, this type of screen form may be referred to as a two-dimensional game screen. Further, as a substitute to CG, picture data or data that processes picture data may be used.

Furthermore, the control unit 50, when predetermined conditions are satisfied, that is, in the case of a special game (a game that carries out a feature stage here), in a virtual three-dimensional space where a column of the determination area 60 extends in a depth direction, an object that shows a symbol is displayed on the display unit 27, a plurality of objects are aligned in a depth direction in the determination area 60 and on the depth side, and by the plurality of objects moving along in a depth direction of the screen of the display unit 27, a plurality of symbols can be changed. That is, the object here, is displayed to change and stop in a virtual three-dimensional space spreading in a depth direction of a screen of the display unit 27. More specifically, the control unit 50 is inclined in a depth direction of a screen of the display unit 27, and the column along the depth direction displays an extending determination area 60, and a game is provided on this determination area 60. As an object that shows a symbol, three-dimensional CG may be used and two-dimensional CG may be used. When three-dimensional CG is used, the three-dimensional model is disposed inside of the virtual three-dimensional space, and a screen can be configured as an image when seen inside a space from a virtual viewpoint set diagonally upward. Further, when two-dimensional CG is used, two-dimensional CG is disposed as if domino tiles are aligned inside of a virtual three-dimensional space, and similarly a screen can be configured. In the specification, this type of screen form may be referred to as a three-dimensional game screen.

It should be noted that the present invention is not limited to any specific length of virtual reel, symbols, ranking of symbols and/or pay lines.

Figure 7:
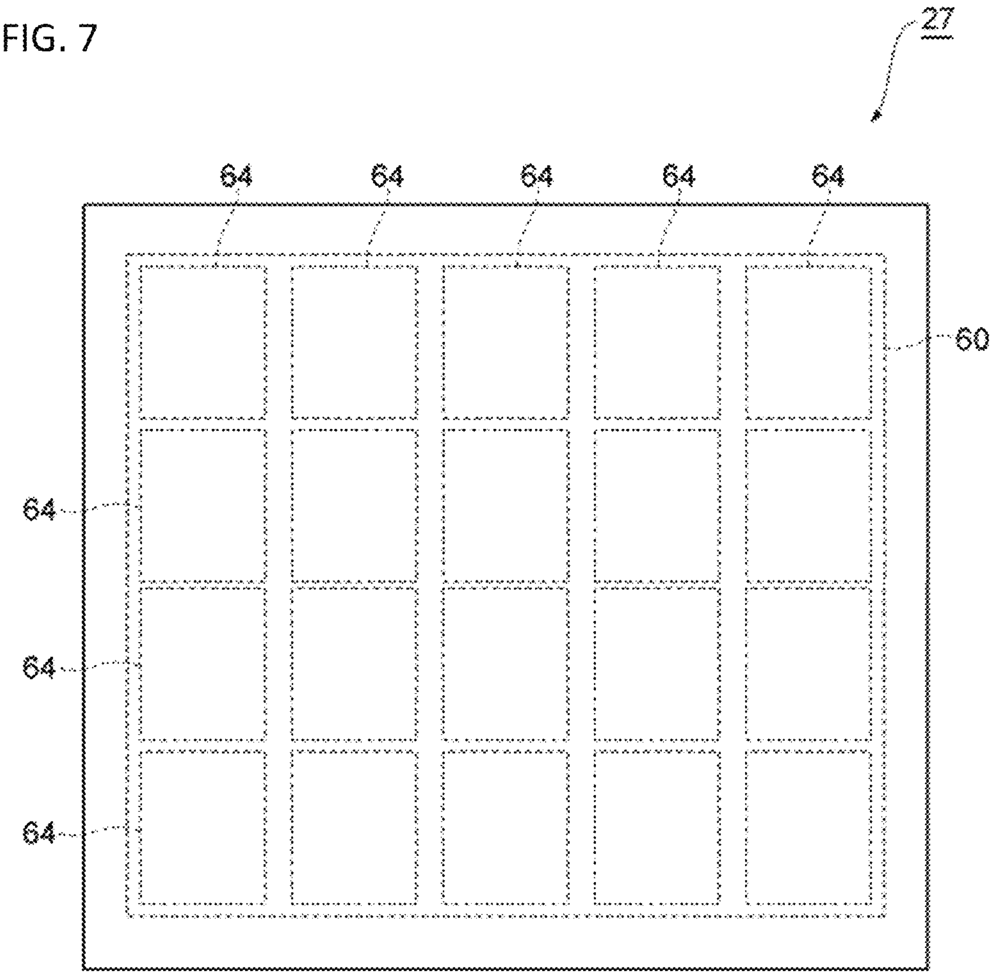
FIG. 7 is a diagrammatic illustration of the determination area of the gaming machine in FIG. 1 with an additional row, according to an embodiment of the present invention.

With particular reference to FIGS. 3, 6, and 7, a first embodiment of the present invention will be discussed. As mentioned, above the present invention may provide a main game and a feature game. The main game, e.g., a video slot game, may be played on a predefined determination area or grid 60. As shown in FIG. 3, in the first embodiment a 3×5 grid of cells 64 may be used. In one embodiment, the main game may be repeatedly played or provided by the control unit 50 until a trigger condition has been met. For instance, in one embodiment the trigger condition may be defined as the appearance of a predetermined number of trigger symbols ("Trig") in an outcome of the main game. It should be noted that the trigger condition may be any suitable condition or set of conditions that may be occur in the main game or occur independent of the main game, e.g., from an outside source such as a player tracking system. The trigger condition may be a mystery trigger event, i.e., an event which while related to the main game is not visible or part of or shown within the outcome of the main game.

Once the trigger condition has been met a bonus or feature (feature game) may be provided.

In the first embodiment of the present invention, the feature game provides a predetermined number of free instances of a games, e.g., free spins of a video slot game. The predetermined number of free instances may be fixed or may be determined once the trigger condition has been detected. For example, in the first embodiment the predetermined number of free spins may be randomly determined.

In one aspect of the present invention, an additional row is added automatically to the grid for each free instance of the game. In one embodiment, the first free game of the feature game uses the standard grid. For example, in the illustrated embodiment the first free game utilizes the standard 3×5 grid. Alternatively, an additional row of cells 64 may be added prior to the first free game.

The additional row may be added at the top of the existing rows or may be added at the bottom or a random or different position. With respect to FIG. 4, with the additional of a new row of cells 64, an additional row of symbols from the reel strips 70 will be visible.

For instance, with respect to FIG. 7, the additional row of cells 64 is added to the top of the previously grid. In FIG. 7, a grid of 4×5 is shown. Returning to FIG. 4 an additional row of symbols from the reel strips would be visible in the additional row.

Figure 8:
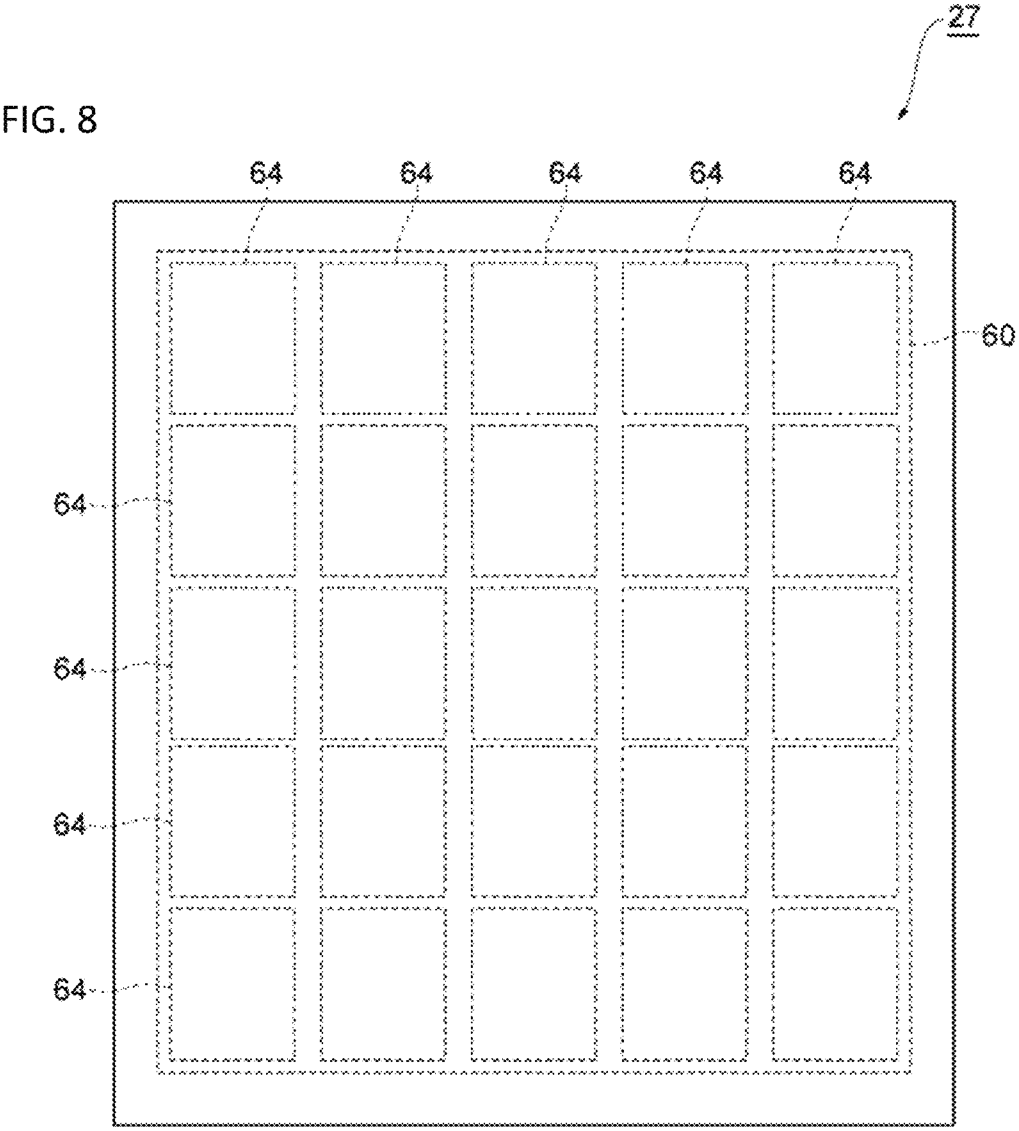
FIG. 8 is a diagrammatic illustration of a determination area of the gaming machine in FIG. 1 with a second additional row, according to an embodiment of the present invention.

In one aspect of the present invention, a new or additional row of cells 64 would be added automatically for every free spin. With reference to FIG. 8, for the next free spin a new additional row may be added automatically. As shown, the grid is now a 5×5 grid of cells 64.

It should also be noted that for every additional row of cells 64 added to the grid 60 additional pay lines are available. In one embodiment, all available pay lines are played during each free play or spin.

In one aspect of the present invention, the control unit 50 randomly establishes a symbol to be displayed within each of the plurality of cells for each instance of the feature game. For example, in the illustrated embodiment, the symbol to be displayed in each cell is randomly established by randomly determining a stop position for each virtual reel 70.

It should be noted that in the illustrated embodiment, each column of the grid is associated with a single virtual reel. Consecutive symbols on each virtual reel are displayed within the cells of the associated column as a function of the stop position.

Alternatively each cell 64 of the grid 60 may have an associated virtual reel such that the symbol displayed in each cell (even within the same column) is established independently.

In one embodiment, each column of cells includes an identical number of cells. For instance in as shown in FIGS. 3, 7, and 8 each column has 3, 4, and 5 cells 64, respectively. In this embodiment, each new additional row will have the same number of cells 64 as every other row.

Figure 9:
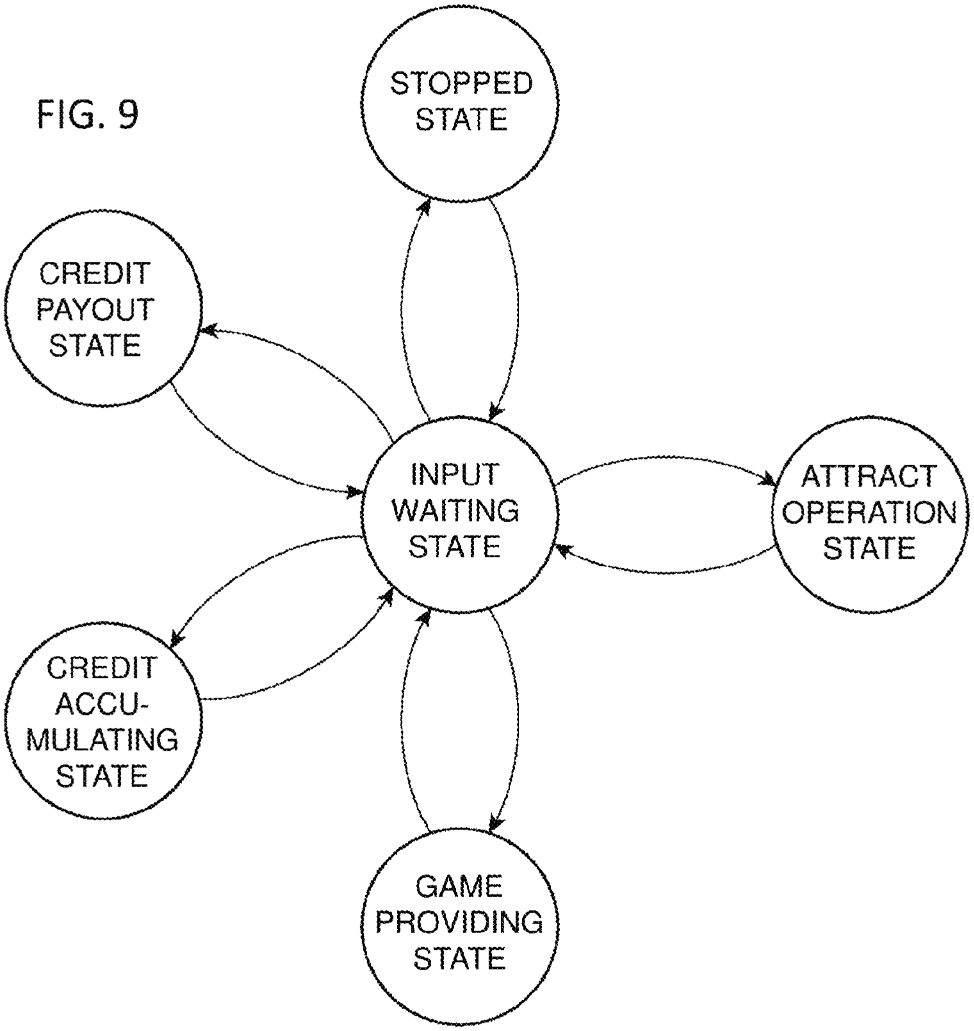
FIG. 9 is a state transition diagram for the gaming machine in FIG. 1.

Next, the operation of the gaming machine 1 according to the present embodiment is described referencing FIG. 9. FIG. 9 shows a state transition diagram of the gaming machine 1 according to the present embodiment configured above. As shown in FIG. 9, the gaming machine 1 takes each state of a game providing states including a stopped state, an input waiting state, a credit payout state, a credit accumulation state, and an attract operation state. Each state is described below.

The stopped state is a state where the gaming machine 1 is not started. The gaming machine 1 in the stopped state started and is initialized when a predetermined start operation is received, a predetermined program is executed by the control unit 50, the game screen is displayed on the lower display 26, which became the input waiting state.

When the bill/ticket identification unit 55 identifies a bill or credit, the gaming machine 1 in the input waiting state switches to a credit accumulation state accumulating information of the corresponding credit inside of the gaming machine 1, and when the accumulation of credits ends, returns to the input waiting state. Further, when the operation of the payout button is received in a state where the information of credits is accumulated, the gaming machine 1 in the input waiting state switches to a credit payout state carrying out payout processing of the accumulated credit, and along with outputting a ticket with printed information corresponding to the credit payout processing from the printer unit 56, the credits accumulated in the gaming machine 1 returns to zero. The gaming machine 1 returns to the input waiting state when these processes finished.

When not operated for a predetermined time, the gaming machine 1 in the input waiting state switches to the attract operation state that displays an attract screen on the upper display 21 and the lower display 26. The gaming machine 1 in an attract operation state returns to the input waiting state when receiving some operation. Further, an attract screen is a screen that appeals the existence of the gaming machine 1 to the customer, and is composed of a predetermined image and/or a video.

The gaming machine 1 in the input waiting state set the bet number and the line number of the game by receiving an operation from the max bet button, or the bet number selection button, the line selection button when a credit is in an accumulated state inside, and by receiving the operation of a start button, is switched to the game providing state along with reducing the credit amount by only the set line number times the credit amount. In the game providing state, a game is provided according to the flowchart shown in FIG. 13 and FIG. 14. The game providing state may be switched according to an operation by the bet number selection button or the max bet button.

In another embodiment of the present invention, wherein at least one of the columns of the plurality of cells includes m cells and wherein at least one other column includes n cells, where n<m.

Figure 10A:
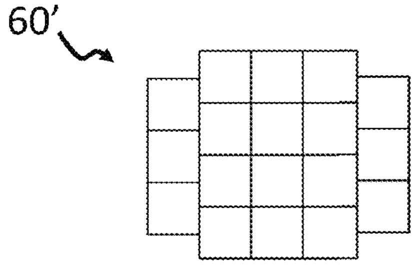
FIG. 10A is a diagrammatic illustration of a determination area of the gaming machine in FIG. 1, according to a second embodiment of the present invention.

One example of such a grid 60' is shown in FIG. 10A. The grid 60' includes 5 columns. In the illustrated embodiment, the first and sixth column includes 3 cells and the second through fourth columns includes 4 cells. In the illustrated embodiment, the grid 60' illustrated in FIG. 10A is shown in an initial state which is used in the main game. It should be noted that this initial state may also be used for the first instance or play of the feature game.

As described above, the player may (repeatedly) play the main game, and the feature game, is entered once the trigger condition has occurred or is detected. In the illustrated embodiment, the feature game includes a predetermined number of free spins. For each free spin, a new row of cells 64 is automatically added to the grid 60'.

As discussed above, the grid 60' in its initial state has a 3-4-4-4-3 configuration. It should be noted that other configurations may also be used, e.g., a 3-4-4-4-4-3 configuration or any other configuration.

Figure 10B:
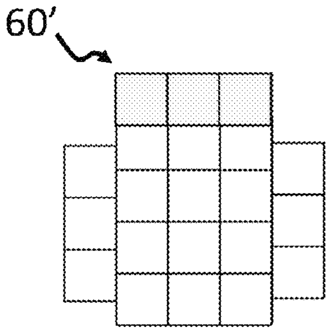
FIG. 10B is a diagrammatic illustration of the determination area of the gaming machine in FIG. 1 with a first additional row, according to the second embodiment of the present invention.
Figure 10C:
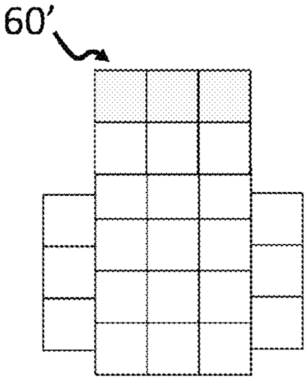
FIG. 10C is a diagrammatic illustration of the determination area of the gaming machine in FIG. 1 with a second additional row, according to the second embodiment of the present invention.
Figure 10D:
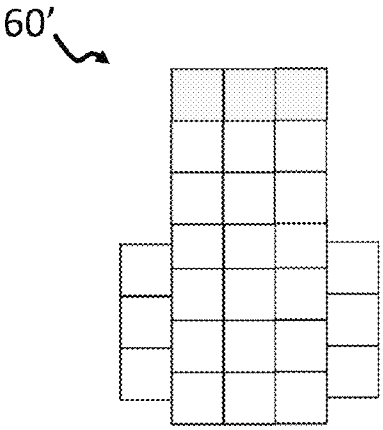
FIG. 10D is a diagrammatic illustration of the determination area of the gaming machine in FIG. 1 with a third additional row, according to the second embodiment of the present invention.
Figure 10E:
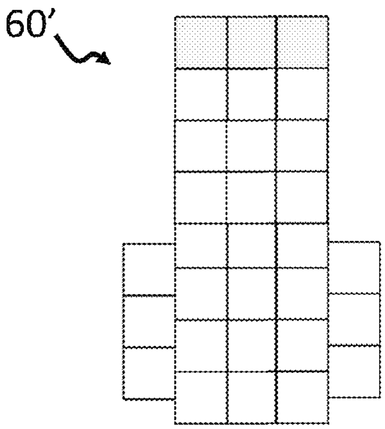
FIG. 10E is a diagrammatic illustration of the determination area of the gaming machine in FIG. 1 with a fourth additional row, according to the second embodiment of the present invention.

The initial state of the grid 60' is used during the main or primary game. In the illustrated embodiment, once the feature game has been initiated, a new additional row is added to the grid 60' for the first free spin (see FIG. 10B). In the illustrated embodiment, the state of the grid 60' is only shown for the first 4 free spins. In FIG. 10C, a second additional row has been added. In FIG. 10D, a third additional row has been added. And in FIG. 10E, a fourth additional row has been added.

In one embodiment, each new row includes a cell 64 within each column. In another embodiment, each new row includes a cell 64 within at least one column. As seen in FIGS. 10A-10E, in the second illustrated embodiment each new row includes a cell 64 in columns 2 through 6.

As discussed above, in one embodiment, the gaming machine 1 provides a main or primary game and a feature game. The feature game is initiated when the trigger condition has occurred. In the illustrated embodiments, both the main game and the feature game are video slot games. Each column of the grid 60, 60' has an associated virtual reel 70. The control unit 50 is configured to rotate and stop the virtual reels 60 during each instance of the main and feature games.

Figure 11:
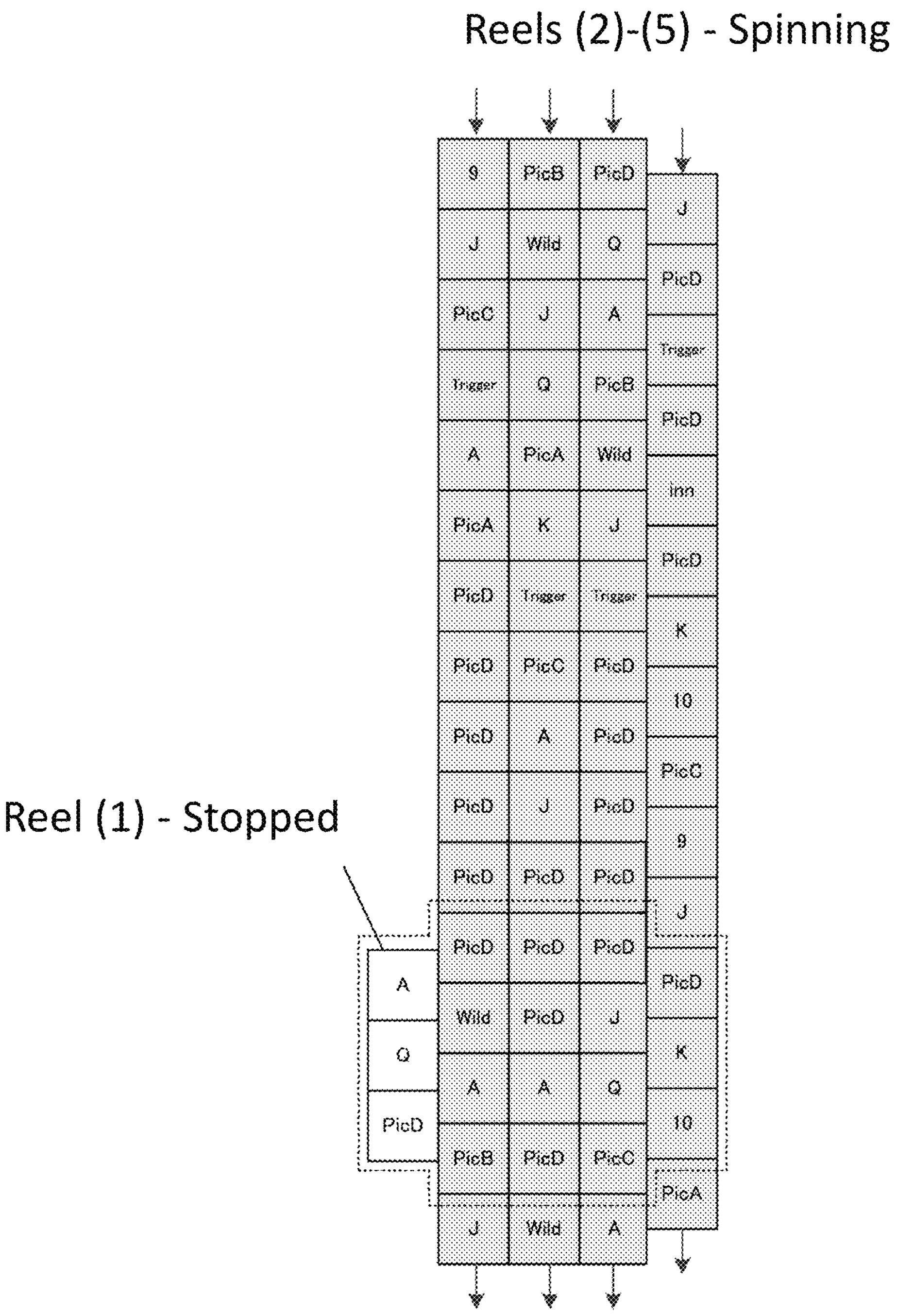
FIG. 11 is a figure showing one example of a symbol arrangement showing the order of symbols displayed on the determination area in FIG. 10.
Figure 12:
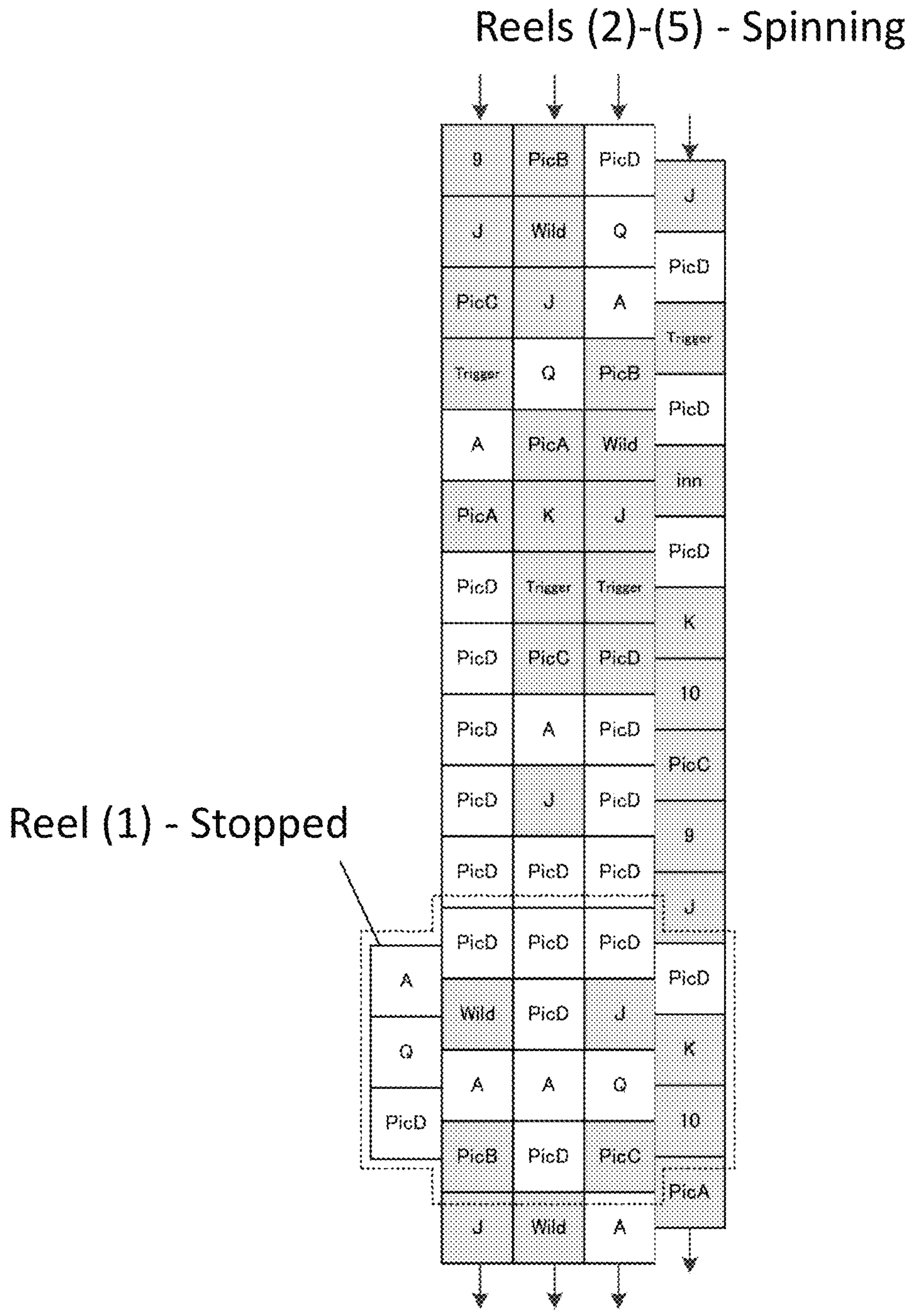
FIG. 12 is a figure showing a second example of a symbol arrangement showing the order of symbols displayed on the determination area in FIG. 3.

In the illustrated embodiment, the feature game includes a predetermined number of free spins of the virtual reels 70. With reference to FIGS. 11 and 12, an exemplary symbol arrangement showing the order of symbols displayed on the determination area 60' of the second illustrated embodiment is shown. After the initiation of a spin, all reels 70 are spinning. Reel (1) is then stopped and symbols "A", "Q" and "Pic D" are displayed in the first column.

As shown in FIG. 11 in one embodiment, reels 2-6 may be initially dimmed. The reels 2-6 may be dimmed in any manner to de-emphasize the symbols on reels 2-6 or (effectively) highlight the symbols on the first reel (reel (1)). For example, the symbols on reels 2-6 may be converted to greyscale, may be made translucent or partially translucent, may appear less bright as the symbols on reel (1), or otherwise modified.

In the arrangement shown in FIG. 11, reels 2-6 are dim and are still spinning. Reel 1 has just stopped. In FIG. 12, after Reel 1 has stopped, any symbols that are similar to the symbols displayed in the first column are highlighted, i.e., undimmed, on (still spinning) reels 2-5. The process shown in FIGS. 11 and 12 may be applied to both instances of the main or primary game and/or instances of the feature game.

In one embodiment of the present invention, the designated area or grid may be alternatively displayed in a two-dimensional plane on the display unit or inside of a virtual three-dimensional space on the display unit. For instance in one embodiment, the cells 64 may be in a two-dimensional plane on the display unit, during the main game and inside of a virtual three-dimensional space on the display unit during the feature game. Visual representations of a designated area or grid 60 (with a 3-4-4-4-3 configuration) is shown with the cells being displayed in a three-dimensional space on the display unit.

In another aspect, of the present invention wherein the symbols displayed in the cells for each instance of the game, main (or primary) and feature game, form an outcome associated. In on embodiment of the present invention, the control unit 50 is configured to award a payout to the player as a function of each outcome. More particularly, the award may be a function of the outcome, one or more pay lines, and a predetermined pay table.

In another aspect of the present invention, a control method for a gaming machine 1 to provide a game to a player is provided. The gaming machine 1 includes a control unit 10, an operation unit 44, and a display unit 27. The operation unit 44 is configured to receive operation from the player. The display unit 27 is operably coupled to the operation unit 44 and is configured to display a plurality of cells 64. The plurality of cells 64 are arranged in a plurality of rows and columns. The control unit 50 is operably coupled to the operation unit 44 and the display unit 27 and, for each instance of the game, is configured to randomly establish a symbol to be displayed within each of the plurality of cells. The method includes the steps of (1)

providing, by the control unit, a first instance of the game and to display the symbols established for the first instance of the game in the respective cells, and (2) automatically adding a new row of cells to the display unit prior to each subsequent instance of the game.

Figure 13:
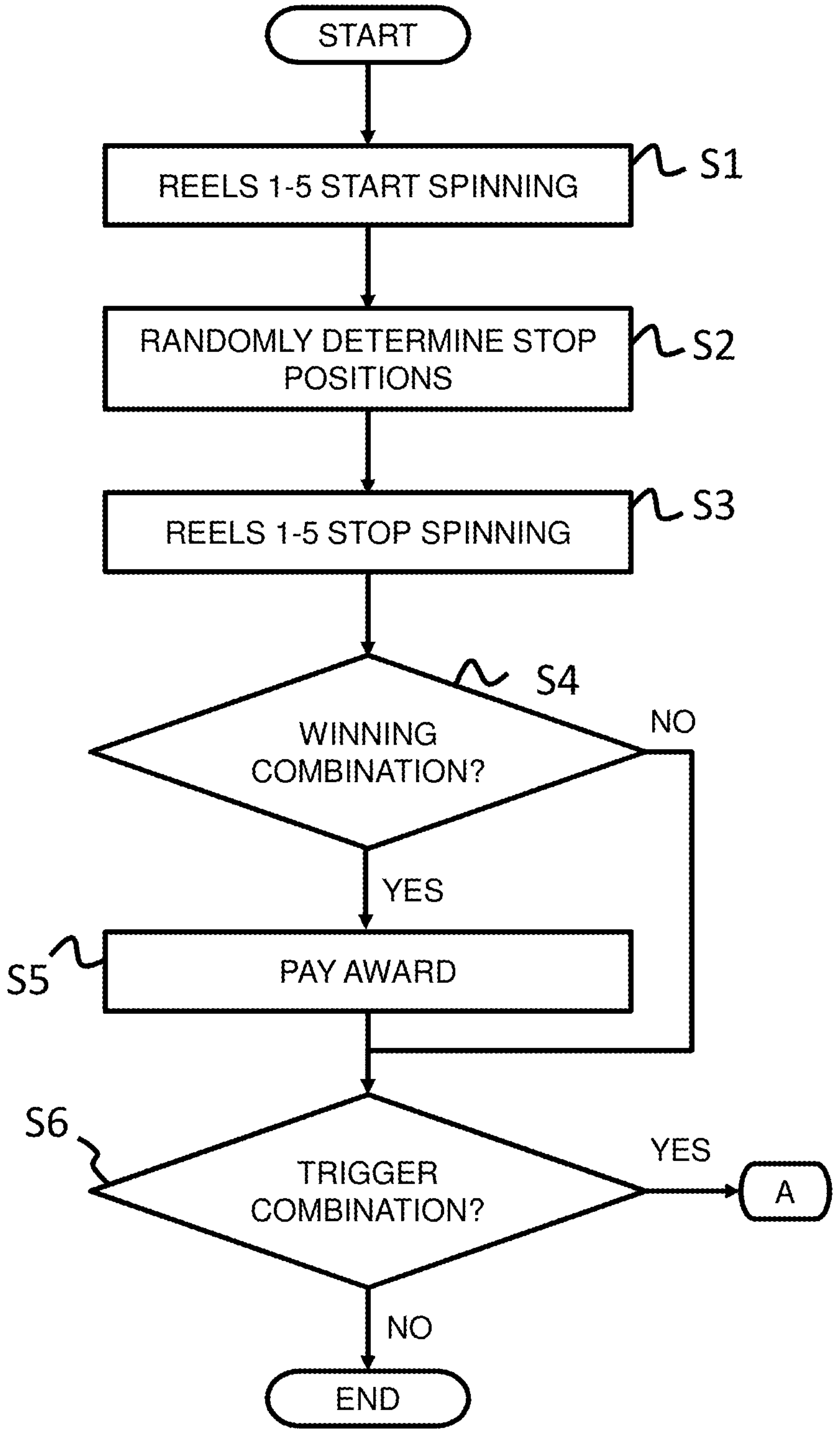
FIG. 13 is a first flow chart describing the operation of the gaming machine in FIG. 1.
Figure 14:
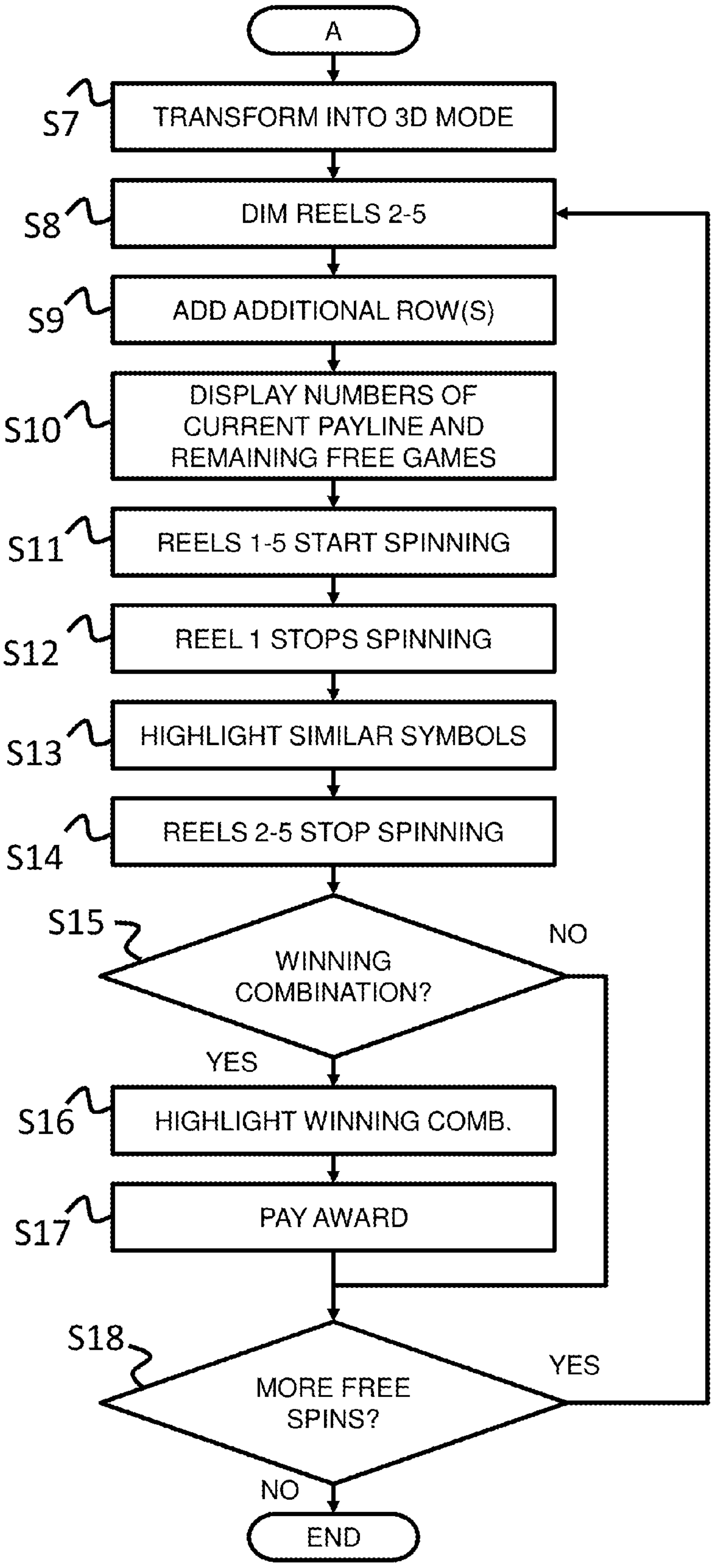
FIG. 14 is a second flow chart describing the operation of the gaming machine in FIG. 1.

With reference to FIGS. 13 and 14, an exemplary flow diagram of a method for operating the gaming machine 1 is shown. In this embodiment, the designated area 60 has 5 columns, and this, 5 reels.

Initially, a main or primary game is played. In a first step S1, reels 1-5 are spin. In a second step S2, a stop position for each reel is randomly determined. In a third step S3, the reels are stopped. The symbols displayed in the determination area or grid 64 form an outcome. The outcome is compared with a predetermined pay table and (played) pay lines. If the outcome forms a winning outcome or combination (S4), then in a fifth step S5, an award is paid to the player (s5). If the outcome is not a winning combination, then the method proceeds to S6. As discussed above, a feature game is initiated if trigger condition has occurred. In this embodiment, the trigger condition is the appearance of a predetermined number of trigger ("trig") symbols in the outcome of the main game.

Figure 15:
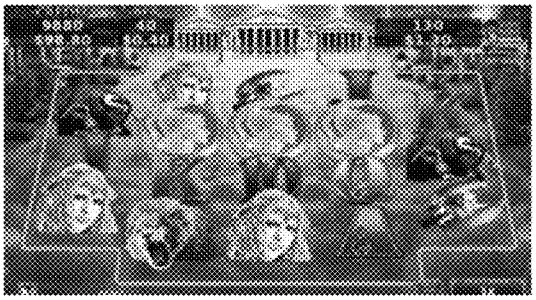
FIG. 15 is an illustration of a determination area with symbols displayed in a virtual three dimensional space.
Figure 16:
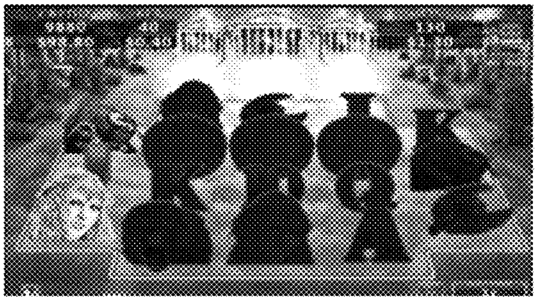
FIG. 16 is a second illustration of a determination area with symbols displayed in a virtual three-dimension space.

If the trigger combination has not occurred (S6), then the main game ends. If the trigger combination appears in the main game, then the method proceeds a seventh step S7. In the seventh step S7, the designated area or grid is transformed into a three-dimensional mode (see FIG. 15). In an eighth step S8, reels 2-5 are dimmed (see FIG. 16).

In a ninth step S9, a new additional row is added to the designated area 60. In one embodiment, the new additional row spans all 5 reels. In another embodiment, the new additional row spans less than all 5 reels, e.g., reels 2-4. As discussed above, and in more detail below, in a different embodiment of the present invention a plurality of new additional rows, e.g., 4 new additional rows, may be added.

In a tenth step S10, the number of currently pay lines and the number of remaining free games or free spins in the feature are displayed.

In an eleventh step S11, reels 1-5 start spinning and in a twelfth step S12, the reel 1 is stopped (see FIG. 11). In a thirteenth step S13, symbols on reels 2-5 that are similar to the symbols displayed in the first column (from stopped reel 1) are highlighted (see FIG. 12).

In a fourteenth step S14, reels 2-5 are stopped. After the reels are stopped, the symbols displayed in the determination area or grid 64 form an outcome. The outcome is compared with a predetermined pay table and (played) pay lines. If the outcome forms a winning outcome or combination (S15), then in a sixteenth step S16, the winning combination is highlighted and an award is paid to the player (S17). If the outcome is not a winning combination, then the method proceeds to S18.

In step S18, if there are any additional free spins available, then the method returns to the eighth step S8. Otherwise, the method ends.

Figure 17:
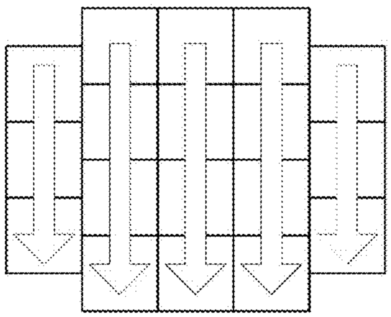
FIG. 17 is a diagrammatic illustration of a determination area of the gaming machine in FIG. 1, according to a third embodiment of the present invention.
Figure 18:
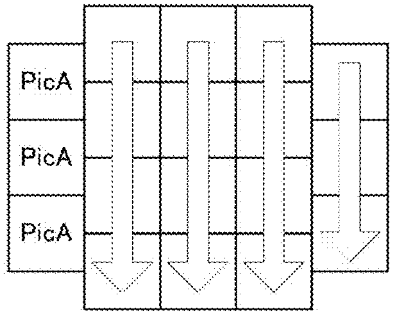
FIG. 18 is a second diagrammatic illustration of a determination area of the gaming machine in FIG. 1, according to the third embodiment of the present invention.
Figure 19:
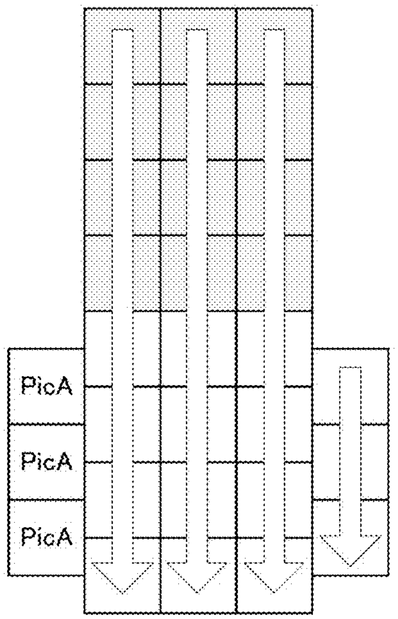
FIG. 19 is a third diagrammatic illustration of a determination area of the gaming machine in FIG. 1, according to the third embodiment of the present invention.
Figure 20:
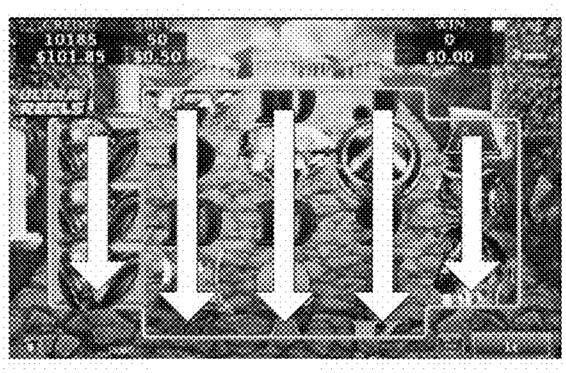
FIG. 20 is an illustration of a determination area with symbols displayed in a two dimensions, according to the third embodiment of the present invention.
Figure 21:
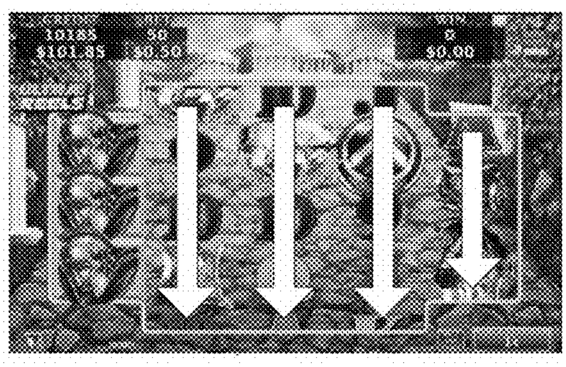
FIG. 21 is a second illustration of a determination area with symbols displayed in two dimensions, according to the third embodiment of the present invention.
Figure 22:
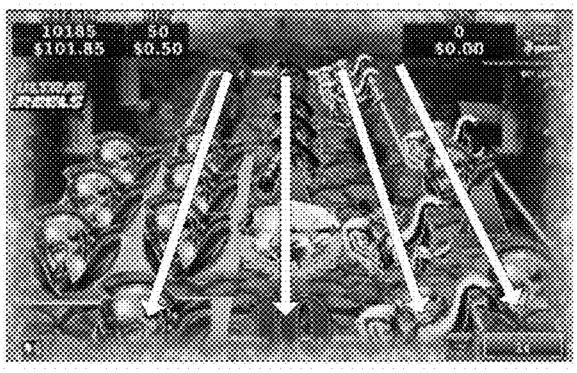
FIG. 22 is an illustration of a determination area with symbols displayed in a virtual three dimensional space, according to the third embodiment of the present invention.

With reference to FIGS. 17-22, another embodiment of the present invention is shown. In this embodiment, an initial 3-4-4-4-3 grid is used. The first and fifth columns are composed of three cells. In this embodiment, the grid shown in FIG. 17 may be used as a main game or in a feature (or feature game). After initiation of the game, all five reels start rotating (see FIG. 17). A screen shot of all five reels spinning in shown in FIG. 20. Thereafter, the first reel stops (see FIGS. 18 and 21). In the illustrated embodiment, if a trigger condition associated with the first reel occurs, then an additional four reels are added behind the second, third, and fourth reels and the two-dimensional grid of FIGS. 17 and 18 are transformed into a three-dimensional grid (see FIGS. 19 and 22). The second, third, fourth, and fifth reels are then stopped to display respective symbols therein and forming a game result. The game result is evaluated and an award paid for any winning combination (see above). Furthermore, in this embodiment after the game result is evaluated and any award paid, the additional four rows are removed and the grid representation is returned to a two-dimensional view.

Next, is a description of a program of the gaming machine 1 for operating one or a plurality of computers as the control unit 50. The gaming machine 1 stores the program in the memory, and can execute the program. The gaming machine 1 can access the program stored in the memory and can operate as the gaming machine 1 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 1 such as a floppy (registered trademark) disk drive device, CD-ROM drive device, and DVD drive device and the like.

In the described gaming machine 1, the control method of the gaming machine 1, and the program of the gaming machine 1, the gaming machine includes an operation unit, a display unit, and a control unit. The operation unit is configured to receive an operation of the player. The display unit is operably coupled to the operation unit and is configured to display a plurality of cells. The plurality of cells is arranged in a plurality of rows and columns. The control unit is operably coupled to the operation unit and the display unit and, for each instance of the game, randomly establishes a symbol to be displayed within each of the plurality of cells. The program of the gaming machine performs the steps of: providing a first instance of the game and displaying the symbols established for the first instance of the game in the respective cells, and automatically adding a new row or a plurality of rows of cells to the display unit prior to each subsequent instance of the game.

The embodiments of the present invention are described above, but the present invention is not limited to such an embodiment, a variety of variations are possible.

In such an embodiment, a situation where a migration from a two-dimensional game screen to a three-dimensional game screen is described when predetermined conditions are satisfied during a regular game in a two-dimensional game screen, but this is not limited thereto, and for example, a regular game may be executed on a three-dimensional game screen.

In such an embodiment, a gaming machine providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

Referring to FIG. 1, in one embodiment, referring to FIG. 1, the control panel 41 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 27 and/or the player tracking unit 57, the paper money/ticket identification unit 42, the operation unit 44, the player tracking unit 57, a coin slot, a ticket in ticket out (TITO) system, a bill acceptor, and/or any suitable device that enables the gaming machine 1 to receive media associated with a monetary value and establish a credit balance for use in playing the gaming machine. In one embodiment, the acceptor device may be configured to receive physical media such as, for example, a coin, a medal, a ticket, a card, a boll, currency, and/or any suitable physical media that enables the gaming machine 1 to function as described herein. The acceptor device may also be configured to accept virtual media such as, for example, a player tracking account, a virtual credit balance, reward points, gaming credits, bonus points, and/or any suitable virtual media that enables the gaming machine 1 to function as described herein. For example, in one embodiment, the coin slot may include an opening that is configured to receive coins and/or tokens deposited by the player into the gaming machine 1. The control unit 50 converts a value of the coins and/or tokens to a corresponding amount of gaming credits that are used by the player to wager on games played on the gaming machine 1. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 1. In one embodiment, the bill acceptor also includes a printer (not shown) that is configured to dispense a printed voucher ticket that includes information indicative of an amount of credits and/or money paid out to the player by the gaming machine 1 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the control unit 50 acquires these random numbers in a batch, and each random number may be stored in the storage area of the non-erasing memory 53 or the storage 54 when power failure occurs. In this type of situation, even when a power failure and the like occurs during a game, because the control unit 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strip from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Further, the control unit 50 may add a new row of the cells in accordance with a predetermined scenario of the feature game. For example, the scenario may define that the controller unit 50 adds new row of cells every twice game instance and the like. For another example, the scenario may define that the controller unit 50 adds i of new row of cells before j-th game instance. In the latter case, the scenario is described as (i, j)=(2,1), (5, 2), (7, 3) for example. There could be a configuration to select a scenario from a plurality of predefined scenarios. Such selection could be made by random, made by symbol combination or made by player's operation (player's selection).

The above-described system, apparatus, and methods overcome at least some disadvantages of known gaming systems by providing a gaming device that provides a bonus game that allows a player to interact with a player symbol to select one or more bonus awards and that increased the probability of winning an award by providing persistent player positions with subsequent bonus games. Moreover, the gaming device provides a game that includes a plurality of game symbols positioned throughout a game maze and allows a player to move a player symbol through the game maze to acquire game symbols. The gaming device also provides an award to the player as a function of the acquired game symbols. In addition, upon completion of the bonus game, the gaming device stores the current location of the player symbol for use in a subsequent bonus game. By providing a bonus game that includes a plurality of game symbols that are acquired by the player to obtain associated awards, and that stores the location of the corresponding player symbol for use in subsequent games, the probability of the player receiving an award is increased. Thus, the amount of time that the gaming devices are played by patrons of a gaming establishment is thereby increased.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, wherein the control unit, in automatically adding a new row of cells, is configured to add automatically add a plurality of new rows of cells to the display unit prior to each subsequent instance of the game.

2. A gaming machine, as set forth in claim 1, wherein each column of cells includes an identical number of cells.

3. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, wherein at least one of the columns of the plurality of cells includes m cells and wherein at least one other column includes n cells, where $n<m$.

4. A gaming machine, as set forth in claim 1, wherein the game is a feature game, the gaming machine for providing a main game, wherein the control unit is configured to detect a trigger condition in the main game and to initiate the feature game in response to detecting the trigger condition.

5. A gaming machine, as set forth in claim 4, wherein the main game and the feature game are video slot games, wherein each column of the plurality of cells has an associated virtual reel, the control unit being configured to rotate and stop the virtual reel during each instance of the main and feature games.

6. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein the main game and the feature game are video slot games, wherein each column of the plurality of cells has an associated virtual reel, the control unit being configured to rotate and stop the virtual reel during each instance of the main and feature games, wherein the feature game includes a predetermined number of free spins of the virtual reels.

7. A gaming machine, as set forth in claim 6, where at least one row of the plurality of cells includes m cells, and wherein during each free spin, the control unit is configured to:

dim a visual representation of reel (2) through reel (m), stop reel (1), and, while reel (2) through reel (m) are still spinning, highlight any symbols on reel (2) through reel (m) that are similar to symbols being displayed in the first column.

8. A gaming machine, as set forth in claim 1, wherein the plurality of cells are arranged in a grid having r rows and c columns.

9. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, wherein the plurality of cells are initially arranged in a 3-4-4-4-3 grid.

10. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, where the plurality of cells are arranged in a 3-4-4-4-4-3 grid.

11. A gaming machine for providing a game to a player, comprising:

an operation unit configured to receive an operation of the player;

a display unit operably coupled to the operation unit and configured to display a plurality of cells, the plurality of cells being arranged in a plurality of rows and columns; and a control unit operably coupled to the operation unit and the display unit and, for each instance of the game, being configured to randomly establish a symbol to be displayed within each of the plurality of cells, wherein the control unit is further configured to:

provide a first instance of the game and to display the symbols established for the first instance of the game in the respective cells, and, automatically add a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein, during the main game, the cells are displayed in a two-dimensional plane on the display unit and during the feature game, the cells are displayed inside of a virtual three-dimensional space on the display unit.

12. A gaming machine, as set forth in claim 1, wherein the symbols displayed in the cells for each instance of the game form an outcome associated with a respective instance of the game, wherein the control unit being further configured to award a payout to the player as a function of each outcome.

13. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, wherein the step of automatically adding a new row of cells, includes the step of automatically adding a plurality of new rows of cells to the display unit prior to each subsequent instance of the game.

14. A control method, as set forth in claim 13, wherein each column of cells includes an identical number of cells.

15. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, wherein at least one of the columns of the plurality of cells includes m cells and wherein at least one other column includes n cells, where n<m.

16. A control method, as set forth in claim 13, wherein the game is a feature game, the gaming machine for providing a main game, wherein the control unit is configured to detect a trigger condition in the main game and to initiate the feature game in response to detecting the trigger condition.

17. A control method, as set forth in claim 16, wherein the main game and the feature game are video slot games, wherein each column of the plurality of cells has an associated virtual reel, the control unit being configured to rotate and stop the virtual reel during each instance of the main and feature games.

18. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein the main game and the feature game are video slot games, wherein each column of the plurality of cells has an associated virtual reel, the control unit being configured to rotate and stop the virtual reel during each instance of the main and feature games, wherein the feature game includes a predetermined number of free spins of the feature reels.

19. A control method, as set forth in claim 18, where at least one row of the plurality of cells includes m cells, and wherein during each free spin, the control unit is configured to:

dim a visual representation of reel (2) through reel (m), stop reel (1), and, while reel (2) through reel (m) are still spinning, highlight any symbols on reel (2) through reel (m) that are similar to symbols being displayed in the first column.

20. A control method, as set forth in claim 13 wherein the plurality of cells are arranged in a grid having r rows and c columns.

21. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, wherein the plurality of cells are arranged in a 3-4-4-4-3 grid.

22. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, where the plurality of cells are arranged in a 3-4-4-4-4-3 grid.

23. A control method for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the method including the steps of:

providing, by the control unit, a first instance of the game and to display the symbols established for the first instance of the game in the respective cells, and, automatically adding a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein, during the main game, the cells are displayed in a two-dimensional plane on the display unit and during the feature game, the cells are displayed inside of a virtual three-dimensional space on the display unit.

24. A control method, as set forth in claim 13, wherein the plurality of cells are arranged in a grid having/rows and m columns.

25. A control method, as set forth in claim 13, wherein the symbols displayed in the cells for each instance of the game form an outcome associated with a respective instance of the game, wherein the control unit being further configured to award a payout to the player as a function of each outcome.

26. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, wherein the step of automatically adding a new row of cells, includes the step of automatically adding a plurality of new rows of cells to the display unit prior to each subsequent instance of the game.

27. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, wherein at least one of the columns of the plurality of cells includes m cells and wherein at least one other column includes n cells, where $n<m$.

28. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein the main game and the feature game are video slot games, wherein each column of the plurality of cells has an associated virtual reel, the control unit being configured to rotate and stop the virtual reel during each instance of the main and feature games, wherein the feature game includes a predetermined number of free spins of the feature reels.

29. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, wherein the plurality of cells are arranged in a 3-4-4-4-3 grid.

30. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, where the plurality of cells are arranged in a 3-4-4-4-4-3 grid.

31. A non-transitory computer-readable memory including a plurality of instructions of a program for a gaming machine for providing a game to a player, the gaming machine including a control unit, an operation unit, and a display unit, the operation unit configure to receive operation from the player, the display unit operably coupled to the operation unit and being configured to display a plurality of cells, the plurality of cells being arranged in a plurality of rows and columns, the control unit operably coupled to the operation unit and the display unit and, for each instance of the game, being configured to randomly establish a symbol to be displayed within each of the plurality of cells, the program of the gaming machine performing the steps of:

providing, by the control unit, a first instance of the game and to display the symbols established for the first instance of the game in the respective cells, and, automatically adding a new row of cells to the display unit prior to each subsequent instance of the game, wherein the game is a feature game, the gaming machine for providing a main game, wherein the control unit is configured to detect a trigger condition in the main game and to initiate the feature game in response to detecting the trigger condition, wherein, during the main game, the cells are displayed in a two-dimensional plane on the display unit and during the feature game, the cells are displayed inside of a virtual three-dimensional space on the display unit.

* * * * *